G. STRICKER.
DRAIN LID FOR COOKING UTENSILS.
APPLICATION FILED NOV. 13, 1912.
1,089,092.
Patented Mar. 3, 1914.
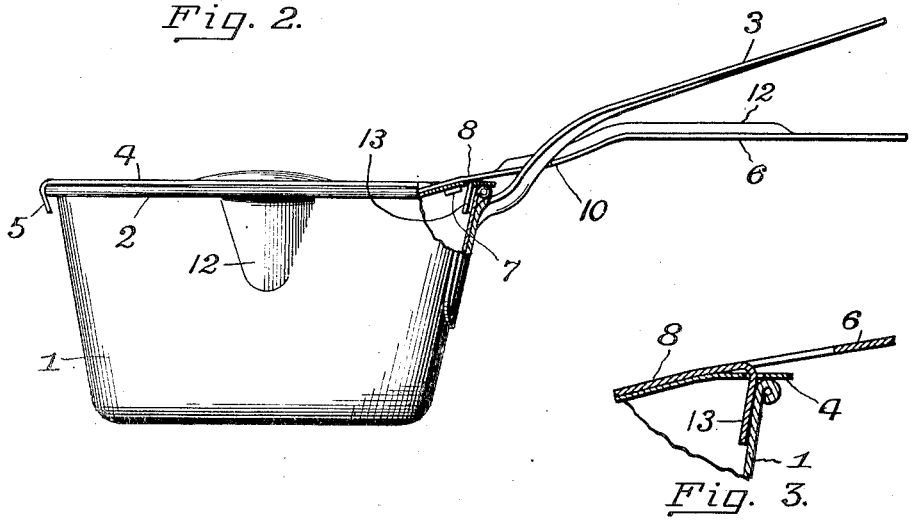
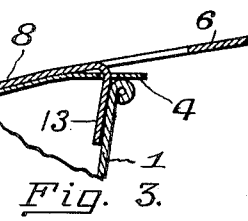
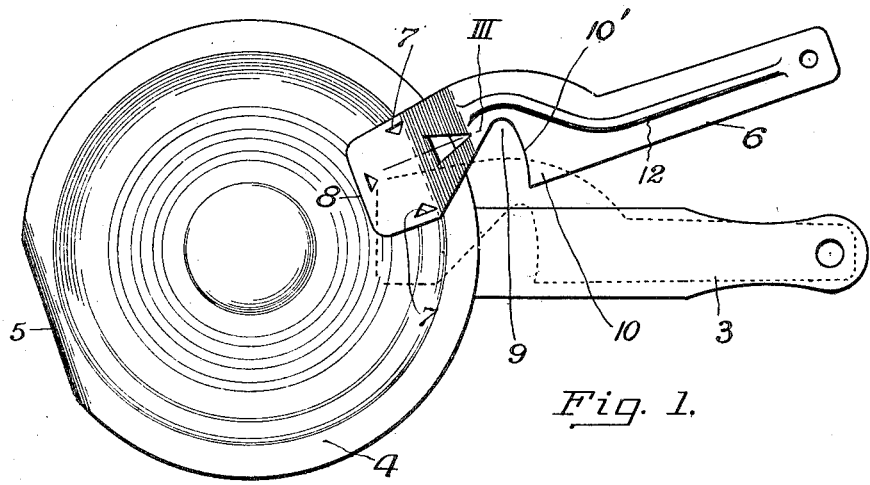
WITNESSES:
L. J. Fischer.
K. Imboden.
INVENTOR
Gertrude Stricker
BY
F. G. Fischer
ATTORNEY

UNITED STATES PATENT OFFICE.

GERTRUDE STRICKER, OF KANSAS CITY, MISSOURI, ASSIGNOR OF ONE-THIRD TO WILLIAM STRICKER, OF KANSAS CITY, MISSOURI.

DRAIN-LID FOR COOKING UTENSILS.

1,089,092. Specification of Letters Patent. Patented Mar. 3, 1914.

Application filed November 13, 1912. Serial No. 731,139.

*To all whom it may concern:*

Be it known that I, GERTRUDE STRICKER, a citizen of the United States, residing at Kansas City, in the county of Jackson and State of Missouri, have invented certain new and useful Improvements in Drain-Lids for Cooking Utensils, of which the following is a specification.

This invention relates to lids for cooking vessels, and has for its object to provide a lid for vessels of that class which will hold itself in position when the vessel is turned to drain the liquid therefrom, while retaining the solid contents.

The lid which I have invented is simple, easily operated, has no springs nor objectionable features, and may be manufactured at low cost.

In order that the invention may be fully understood, reference will now be made to the accompanying drawings in which:

Figure 1 is a top view of a lid embodying the invention and placed upon a stew-pan but not in locked position; the latter being indicated by dotted lines. Fig. 2 is a side elevation of the lid in locked position upon the pan, a portion of which is broken away and a portion of the lid shown in section. Fig. 3 is a sectional detail view, on line III—III of Fig. 1.

1 designates a stew-pan or any other cooking vessel that has a bead 2 or outward flange upon its rim.

3 is the handle which is of the usual form.

Lid 4 is circular in form excepting that it is formed with a downwardly and inwardly turned lip 5, which is adapted to catch under the bead 2 as shown, to hold the lid closed at that side. On the opposite side to said lip 5 is secured a handle 6. This handle may be secured to the lid in any suitable manner. In the drawing, I have shown it secured to the lid by means of points 7, which are struck out from the foot portion 8, of the handle and passed through openings in the lid 4 and clenched.

In the handle 6 is a lateral recess 9, one wall of which constitutes a locking lug 10. The handle is provided with a rib 12, which gives ample rigidity and strength. The recess 9 permits the handle 6 to be passed under the vessel handle 3, to the dotted line position; when in this position, the edge 10′ of the lug 10 will be in close contact with the under side of handle 3, as clearly shown in Fig. 2. The lid when in this position is locked upon the pan, and when it is lifted both handles 3 and 6 are grasped at once, which causes upward pressure on handle 6 and therefore downward pressure upon the lid 4. By pressing the handles toward each other, the lug 10 is caused to slide slightly backward and upward against the curved portion of handle 3, and thus firmly draws lip 5 into engagement with bead 2. Liquid may then be drained by the spout 12, while the other contents will be retained.

While I think the lip 5 will be a sufficient holding means in connection with the handle lug 10, yet additional security may be provided. With this in mind I may provide the lid with a downwardly projecting member, positioned to bear against the inside of the vessel. As shown, such a member, 13, is provided by striking it down from the handle and passing said member through the resultant slot in the lid 4. The member 13 is shown in position, in Fig. 2. Member 13 acts as a positive stop in limiting backward movement of the lid and thus relieves lip 5 of undue strain after the same has been firmly drawn into contact with bead 2.

Having thus described my invention, what I claim and desire to secure by Letters Patent, is:

1. In combination with a cooking utensil having a handle, a lid having a lip to engage the rim of said utensil, and a handle on said lid opposite the lip thereof, said handle having a lateral recess to receive the utensil handle, one wall of said recess constituting a locking lug which engages the under side of the utensil handle and draws the lid firmly into engagement with the rim when the handles are pressed toward each other.

2. A lid, a handle on said lid, said handle having a lateral recess one wall of which constitutes a locking lug adapted to engage the handle of a vessel, and a member projecting downward from the lid in position to contact the inner surface of said vessel.

In testimony whereof I affix my signature, in the presence of two witnesses.

GERTRUDE STRICKER.

Witnesses:
F. G. FISCHER,
L. J. FISCHER.